UNITED STATES PATENT OFFICE.

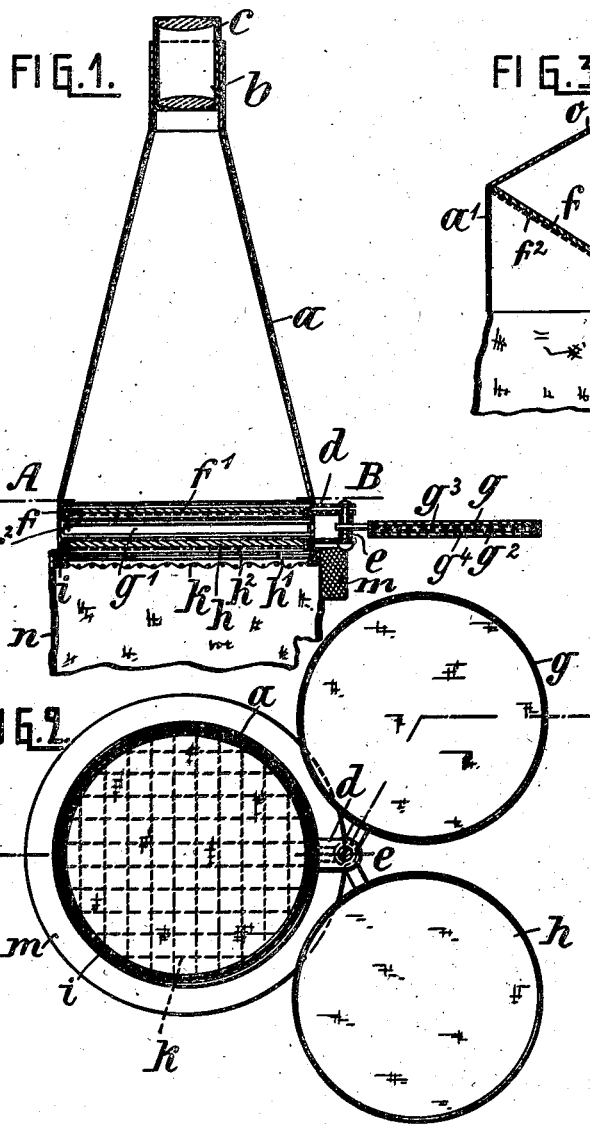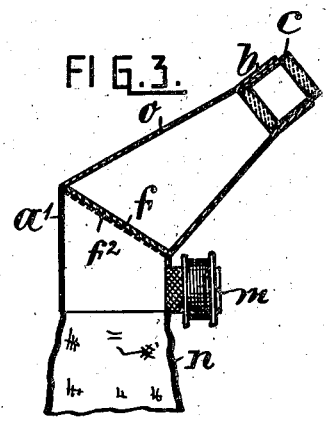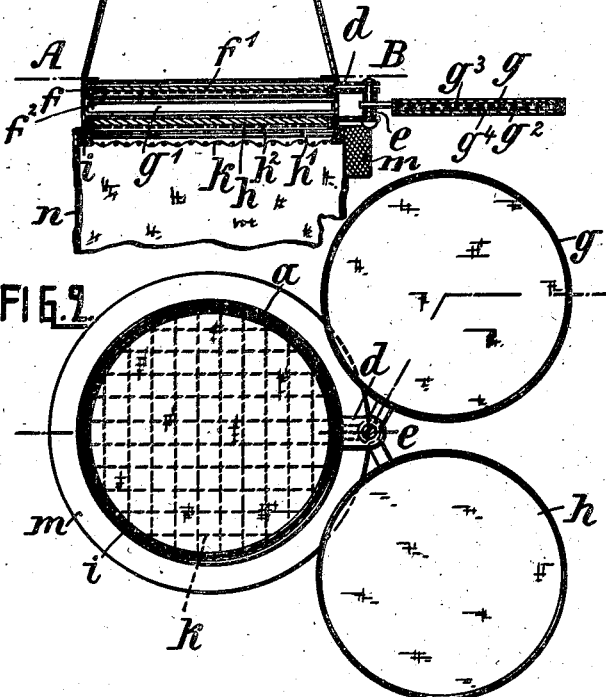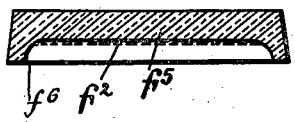

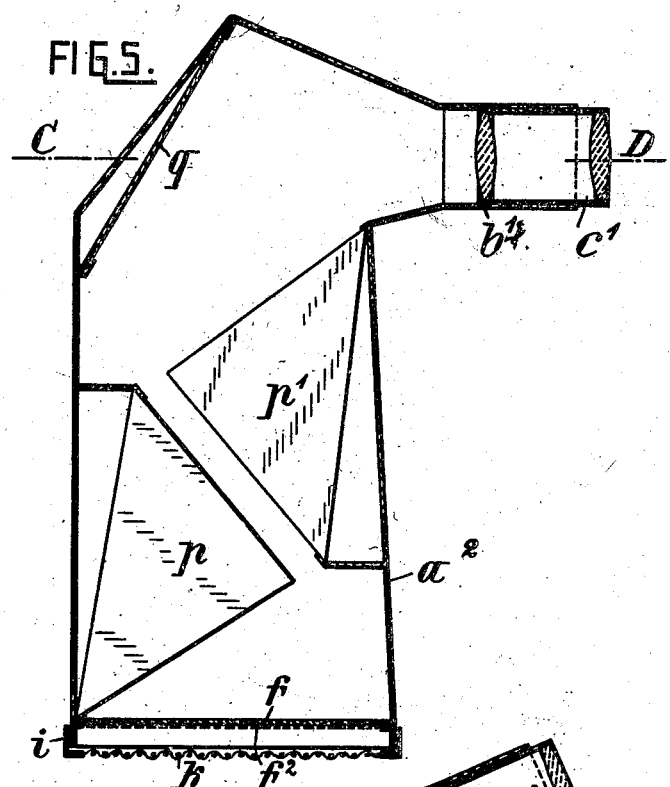
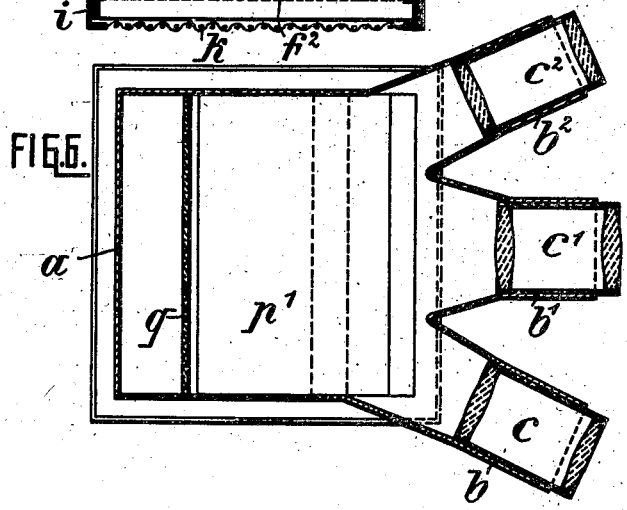

CURT SCHMIDT, OF FREIENWALDE-ON-THE-ODER, GERMANY.

APPARATUS FOR EXAMINING RADIO-ACTIVE SUBSTANCES.

1,242,377.                    Specification of Letters Patent.    Patented Oct. 9, 1917.

Application filed April 11, 1914. Serial No. 831,310.

*To all whom it may concern:*

Be it known that I, CURT SCHMIDT, a subject of the German Emperor, residing at Freienwalde-on-the-Oder, Germany, have invented certain new and useful Improvements in Apparatus for Examining Radio-Active Substances; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to radio-active demonstration and examination devices, and has for its object to permit the alpha-rays to be recognized, means being provided to either materially cut down or entirely absorb the beta and gamma rays, so harmful to the eyes of the observer, or when strong I observe the alpha rays at an angle to the direct path of the rays.

In order that my invention may be fully understood, I have illustrated in the annexed drawings, by way of example, several forms of my invention, in which drawings like parts are similarly designated.

Figure 1 is a vertical central section of one form of apparatus, and

Fig. 2 is a horizontal section on the line A—B of Fig. 1.

Fig. 3 is a modified form of apparatus.

Fig. 4 is a section of a plate used for viewing small objects.

Fig. 5 is a vertical section; and

Fig. 6 is a horizontal section on the line C—D of Fig. 5, of a modified form of apparatus.

Referring to Figs. 1 and 2, $a$ is a conical, cylindrical or similar tube or body of any convenient shape in cross section, and here shown as circular. The upper end of this body terminates in a tube $b$ in which is mounted an eye piece, magnifying as is usual with eye pieces, and slidable therein in any suitable manner.

On the side of the body $a$ near its lower end is secured a bracket or arm $d$ having a downwardly directed pin or bolt $e$ on which is mounted to swing a plurality of supports, screens or disks. There are three disks shown in Fig. 2, $f$, $g$, and $h$, that swing through openings or slots, $f'$, $g'$ and $h'$, in the body. These openings are normally covered by a black cloth, or any other means for excluding outside light.

In Fig. 1 the two supports or plates $f$ and $h$ are shown swung into their openings $f'$ and $h'$, i. e. are in operating position, while in Fig. 2, $g$ and $h$ are both shown swung out.

These supports or plates may be of glass, celluloid, or other material pervious to light, and are used for supporting a coating of fluorescent or fluorescing material and comparison slides having a radio-active coating, or a coating that is both fluorescent and radio-active. They may be of any suitable form, and may have, if desired, the form shown in Fig. 4.

For example, the fluorescent coating may be a coating whose active substance is platinum cyanid, zinc sulfid and other substances having similar fluorescent properties.

The radio-active coating may be a coating of or containing radium chlorid, thorium, or its salts or any radio-active substances, and the mixed coating may be a coating containing a mixture of these substances.

In Figs. 1 and 2 the upper plate $f$ is coated with a mixed coating $f^2$ of fluorescent material and radio-active material on its under face. The plate $g$ is a double plate and composed of two plates $g$ and $g^2$ between which is a fluorescent layer $g^3$ and a radio-active layer $g^4$, and the lower plate $h$ is provided with a fluorescent layer or coating $h^2$ only.

Instead of having the three plates separately mounted to independently swing into and out of their openings, they may be mounted in a frame to swing as a unit successively into and out of operative position.

Below these plates is a ring $i$ detachably secured to the body $a$ in any suitable manner, conveniently by a bayonet joint, and this ring carries a grid $k$ of wire net, threads, or a woven fabric of spun glass, and acts as a guard to prevent the substance that is being examined from injuring or rubbing the coating on the plate next above. It is made removable so that it may be replaced by another like grid when it has become radio-active by too extensive use.

I have illustrated my invention as provided with only three slides or plates, one of which $h$, is always required when viewing the alpha rays, and the other two are comparison plates that are swung out of the path of the rays or optical axis. Any number of comparison slides $f$, $g$ may be used.

Hanging from the ring $i$ is a flexible extension of any sort capable of excluding light, such as a cloth or bellows $n$ and within which the object to be viewed is placed.

The magnet may be connected to the body, as may also the extension, as illustrated in Fig. 3.

In this figure the body $a'$ has an inclined portion $o$ whose smaller end $b$ contains the eye piece $c$. The plate $f$ having a fluorescent layer $f^2$ is placed inclined at about the juncture of the two portions $a'$ and $o$. By means of the magnet the beta rays are deviated, the alpha rays travel to the plate $f$ and their scintillations are viewed by the operator, while the gamma rays pass through the plate directly upward and do not pass to the observer.

For small or flat objects the plate $f$, grid $k$, and frame $i$, may be omitted, and in their place a plate such as shown in Fig. 4 in cross section may be used. This watch crystal or plate $f^5$ which may be of glass, celluloid or other suitable material, has a recess $f^6$ on its under side, and the bottom of the recess is coated with the coating $f^2$. The plate is placed over the object to be viewed.

In Figs. 5 and 6, the body $a^2$ has in its upper portion several tubular portions $b$, $b'$, $b^2$, containing eye pieces $c$, $c'$, $c^2$, substantially horizontally directed, so that a number of observers may simultaneously view the same specimen. In its lower portion is a coated plate $f$ and above this plate are two prisms $p$ and $p'$ preferably but not necessarily spaced apart, and supported in any suitable manner. In the upper part, opposite the eye pieces is an inclined mirror $q$ in which the rays may be viewed. As the prisms deviate or reflect only the light rays, only the alpha rays will be viewed in the mirror, the beta and gamma rays being either entirely or partly absorbed by the prisms or passing directly out of the apparatus.

The operation is as follows:

The object to be viewed is placed under the apparatus, and the rays emanating therefrom pass to the fluorescent coating and cause its illumination or fluorescent action and the light so produced is viewed through the eye-piece.

The plates, or films on them may be so chosen as to pass only the alpha rays under ordinary conditions, but where the emanations are strong the magnet $m$ will deflect the alpha rays slightly from a direct path, or the illumination produced by them on the fluorescent layer may be reflected by means of prisms, or both magnet and prisms may be used. It should be noted that an inclined transparent or translucent plate across the path of the rays operates as a prism and reflector.

The alpha-radiation may be viewed directly, as in Figs. 1 and 3, or indirectly, by reflection, as in Figs. 5 and 6.

The eye-pieces may be focused to suit the eye of the observer, and onto any one of the superposed or successive plates, and magnify the image or rays to be observed.

It should be noted that many substances, especially those that have been chemically prepared, emit only alpha rays, some only alpha and beta rays, or the latter rays only, but that the gamma rays are never produced alone, and are always accompanied by beta rays.

I claim—

1. In a device for viewing radio-active substances, the combination with a body having an observation opening therein, a fluorescing film arranged to be above the body to be viewed and means to prevent the rays from passing to the observation opening.

2. In a device for viewing radio-active substances, the combination with a body having an observation opening, a fluorescing film in said body, and means arranged between the opening and base of the body and acting to absorb beta and gamma rays, but permitting the passage of alpha rays.

3. In a device for viewing radio active substances, the combination with a substantially light-tight body having an observation opening; of a fluorescing film, means for absorbing the beta rays and gamma rays, and means for deviating alpha rays into the line of observation both of said means permitting the passage of alpha rays.

4. In a device for viewing radio-active substances, the combination with a body, of a fluorescing film, means therein for reflecting light rays due to radio activity, means for deviating some of said rays, and means for absorbing some of said rays.

5. In a device for viewing radio-active substances, the combination with an observation body, of a plurality of supports therein movable into and out of the line of observation, said supports having test coatings and a transparent observation coating.

6. In a device for viewing radio-active substances, the combination with an observation body, of an eye-piece therein out of axial alinement with the body, a fluorescing film in said body, and means in the body to permit the passage of alpha-rays only.

7. In a device for viewing radio-active substances, the combination with an observation body having an upper portion at an angle to its lower portion, and an eye piece in said upper portion; of a fluorescing film in said lower portion, means in said body to permit the light rays to be visible through said eyepiece without the radio-active rays passing through said eye piece.

8. In a device for viewing radio-active substances, the combination with an observation body having a plurality of openings therein, of a plurality of plates pivoted to swing into and out of said openings, said plates being provided with coatings having a screening effect on beta and gamma rays.

9. In a device for viewing radio-active substances, the combination with an observation body having a plurality of openings therein, of a plurality of plates pivoted to swing into and out of said openings, said plates being provided with coatings having a screening effect on beta and gamma rays, the lowermost of said plates constituting a protector for the other plates above.

10. In a device for viewing radio-active substances, the combination with an observation body having a plurality of openings therein, of a plurality of plates pivoted to swing into and out of said openings, some of said plates being provided with test coatings and another having a screening effect on beta and gamma rays, and a magnet surrounding the body.

11. In a device for viewing radio-active substances, the combination with an observation body having an adjustable magnifying eye-piece and a plurality of openings therein; of a plurality of plates pivoted to simultaneously and independently swing into and out of said openings, one of said plates having a fluorescent film thereon, a protecting grid for said plates detachably secured to said body, a light proof fabric thereon forming an extension of said body below said plates and grid, and a magnet for deviating rays.

12. In a device for viewing radio-active substances, the combination with a body and an eye piece mounted in the body the axes of which are at an angle to one another, of an inclined mirror opposite the eye piece, dispersing prisms in the body in the path of the rays from the substance to be viewed, and a fluorescent layer also in the path of the rays from said substance.

In testimony that I claim the foregoing as my invention, I have signed my name in presence of two subscribing witnesses.

CURT SCHMIDT.

Witnesses:
  OTTO BUSECK,
  HENRY ORTH, Jr.